April 9, 1957    E. L. TURNER ET AL    2,788,429
PROCESS AND GAS FOR INERT GAS SHIELDED ARC WELDING
Filed March 22, 1954
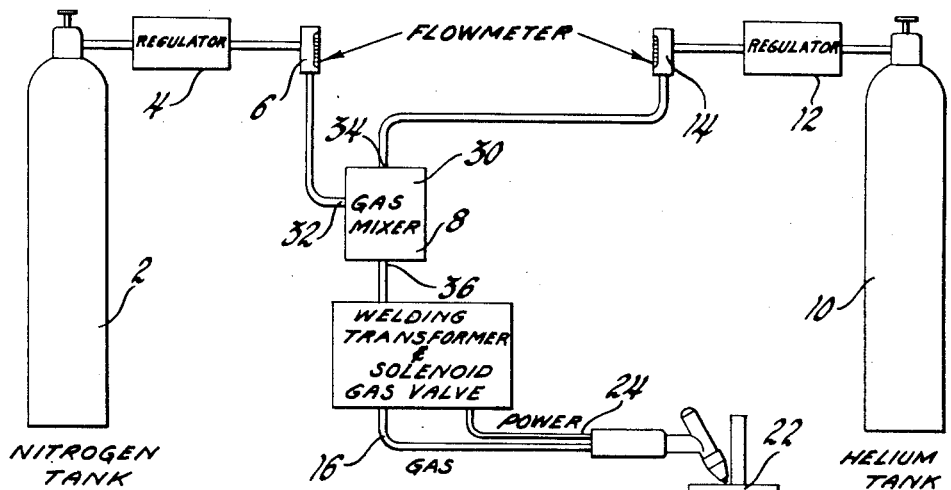
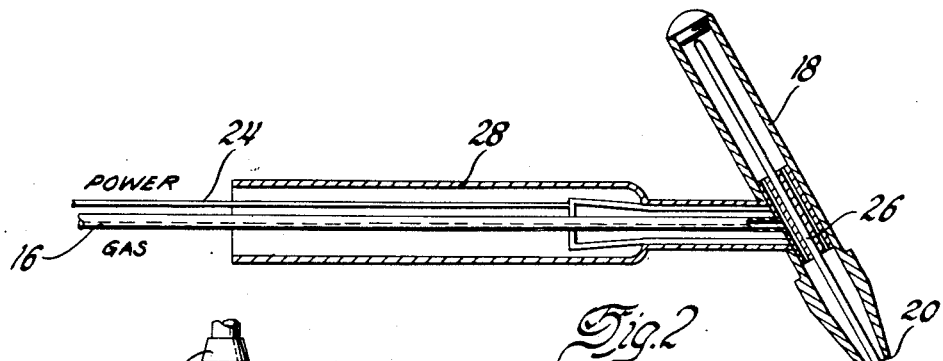
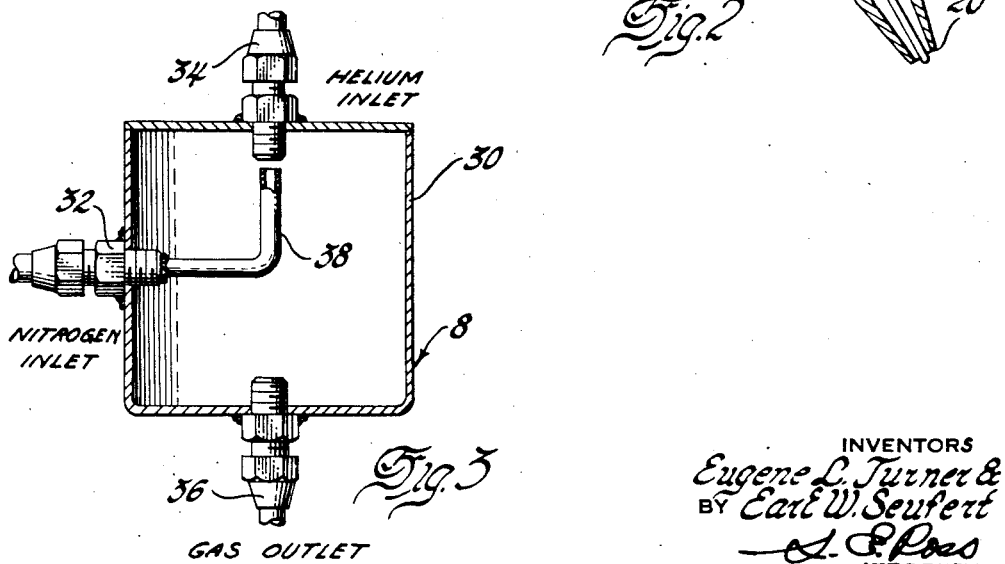
INVENTORS
Eugene L. Turner &
Earl W. Seufert
ATTORNEY

United States Patent Office 2,788,429
Patented Apr. 9, 1957

2,788,429

PROCESS AND GAS FOR INERT GAS SHIELDED ARC WELDING

Eugene L. Turner, Kansas City, Mo., and Earl W. Seufert, Kansas City, Kans., assignors to General Motors Corporation, Detroit, Mich., a corporation of Delaware Application March 22, 1954, Serial No. 417,668

6 Claims. (Cl. 219—74)

The present invention relates to electric arc welding in a gaseous medium and more particularly, to an improved method for inert gas shielded arc welding and an improved inert gas mixture for use in same.

In inert gas shielded arc welding, an arc is struck and maintained between the electrode and the work piece while the electrode, arc, and weld are blanketed or shielded by an inert gas or a mixture of inert gases to prevent the formation of oxides in the weld metal. Either a consumable or non-consumable type of electrode may be used. Where a tungsten, carbon or other non-consumable type electrode is employed, the weld metal may be provided either from the work pieces or from a filler wire which is fed into the joint by the operator. The electrode is held in a workholder and the inert gas is usually projected from this workholder in the form of a stream which blankets the electrode tip, the arc and the weld puddle. The use of inert gases as the protective blanket is particularly advantageous in that relatively low voltages are required to strike and maintain the arc. It also provides for a relatively corrosion free weld, high welding speed, reduced grinding requirements and dispenses with the need for flux cleaning. This type of welding has been used with much success on the light metals and their alloys as well as on the ferrous metals such, for example, as low carbon and stainless steels.

One of the chief disadvantages of inert gas shielded arc welding is the relatively high cost of the inert gases or inert gas mixtures which have heretofore been used. Probably the most commonly used inert gas shield is that consisting of a mixture of helium and argon. The relatively high cost of argon causes such a mixture to be rather high in cost.

It has been found that the composition of the inert gas blanket has a marked effect on the characteristics of the arc, the voltage required to start and maintain the arc and on the resulting weld. Attempts have been made to use pure nitrogen for the inert gas shield in order to reduce costs, however, this has been found to be unsuccessful because of nitride formation, increased weld porosity, and other detrimental effects. Likewise, little success has been had with the use of helium as a shielding gas chiefly because it renders the arc unstable.

It is an object of the present invention to provide an improved and relatively inexpensive inert gas mixture for use in gas shielded arc welding operations.

Another object of the invention is the provision of an improved method for gas shield arc welding wherein the gas mixture used is relatively inexpensive, provides an improved weld and requires the use of comparatively low amperage thereby resulting in further savings in cost.

These objects are carried out in accordance with the invention by the provision of a gas mixture consisting of helium and nitrogen mixed in certain proportions, said mixture providing the inert gas shielding blanket for arc welding operations.

We have found that nitrogen when mixed with helium has an important effect upon the electrical behavior of the welding arc. In any welding arc, the temperature of the arc column is determined by the arc current, the heat conduction and convection properties of the arc atmosphere, and the effective ionization potential of the arc gases. A change in any one of these factors produces corresponding changes in the voltage gradient and in the temperature of the arc column. Increasing the heat transferability of the arc atmosphere reduces the arc column diameter and increases the temperature and voltage gradient of the arc column. Nitrogen like other diatomic gases is completely disassociated at arc temperatures. The recombination of the single atoms to form diatomic gas molecules results in the liberation of heat to the arc atmosphere thereby increasing the heat transferability. Thus, the arc temperature and voltage gradient are increased while the current is decreased.

We have further found that these and other advantageous effects of nitrogen in the arc atmosphere can be attained by using a mixture consisting of one part by volume of nitrogen and from 20 to 22 parts, by volume of helium. By far the most advantageous results may be attained by using a mixture of 1 part by volume nitrogen and 22 parts by volume helium (approximately 4.5% by volume nitrogen). These proportions have been found to be very critical since even a slight excess of nitrogen over the 1 to 20 ratio causes extensive porosity in the weld and slight excesses of helium cause the same disadvantages as are encountered when pure helium is used. While the welds obtained with all mixtures within the 1 to 20 ratio are quite satisfactory, those obtained with the 1 to 22 ratio are exceptionally good and far superior to the others.

With pure helium the weld bead tends to sink or have a concave appearance. However, with the nitrogen-helium mixture in the proportion as specified, the bead becomes convex thereby adding strength to the weld especially when it is of the T-joint type. Welding at the same speed and with the same depth of penetration, less amperage is required to weld with the helium-nitrogen mixture as compared to the conventional helium-argon mixture. When using helium-nitrogen a smaller tungsten electrode, a smaller filler wire and less gas flow may often be used due to the decrease in current necessary for welding. Also, greater reduction in cost per cubic foot of gas mixture used is among the chief advantages observed for our new method.

Apparatus for the practice of the invention is shown in the accompanying drawings, wherein:

Figure 1 is a diagrammatic view of the welding apparatus;

Figure 2 is a sectional view of the electrode support; and

Figure 3 is a sectional view of the gas mixer which is part of the apparatus shown in Figure 1.

Referring to Figure 1, nitrogen from the tank 2 flows through the regulator 4 and flow meter 6 to the gas mixer 8 where it is uniformly mixed with helium from tank 10, the helium flowline also being provided with a regulator and flowmeter as shown at 12 and 14 respectively. From the gas mixer, which will be described in detail hereinafter, the nitrogen-helium mixture flows through the line 16 to the tubular electrode support 18, where it is directed in a stream around the tip of electrode 20 into and around the welding arc and against the weld puddle of the workpiece 22. A solenoid gas valve may be placed in the line 16 for control of the gas flow by the welding operator.

A welding transformer of any suitable type supplies current to the power line 24 which is electrically connected to electrode 20 by the tubular member 26 within the electrode support. In the particular embodiment shown, electrode 20 is of the non-consumable type and consists of tungsten or tungsten alloy. To protect the power line and gas line connections with the electrode and its support 18, a suitable shield 28 may be provided. There is also provided electrical power control means (not shown) for the welding operator.

To assure complete uniformity of the nitrogen-helium gas mixture, which has been found to be necessary for the successful practice of the welding method of this invention, we have provided an improved gas mixer 8, a preferred embodiment of which is shown in Figure 3. This mixer comprises a closed container 30 which may be cylindrical in shape, having a nitrogen inlet 32, a helium inlet 34 and a gas mixture outlet 36. Within the container the nitrogen inlet is provided with a suitable nozzle 38 which directs the stream of nitrogen directly counter-current into the incoming stream of helium. In the embodiment shown the nitrogen inlet is positioned on the side of the tank and the helium inlet on the top of the tank and thus the nozzle 38 is in the form of an elbow-shaped pipe. The stream of nitrogen flowing counter-current directly into the stream of helium creates turbulence and assures a thorough mixing of the gases within the container 8. Thus, a very uniform gas mixture may be drawn from the outlet 36. This method and apparatus for mixing the gases is described and claimed in our co-pending application Serial No. 417,669, filed March 22, 1954.

In practicing the improved method of this invention, the welding operator starts the electrical power and the flow of helium-nitrogen gas mixture (having the proportions heretofore specified) to the electrode support and then strikes an arc between the workpiece 22 and the electrode 20. Maintaining the arc, the welding operator proceeds in the usual manner to move the electrode along the line of the intended joint to form the weld. Where a non-consumable type of electrode is used a filler wire may be fed into the joint if necessary.

In a group of tests, the ductibility, microstructure and tensile strength of welds made using the 1 to 22 ratio nitrogen-helium mixture were studied. These tests consisted of butt welds on .125 in. thick low carbon steel and fillet welds in the form of T-joints also on steel of .125 in. thickness. The steel used was in the "as sheared" form and no attempt was made to remove burrs, rust, or oil prior to welding. Preparation of the joint was limited to tack welds at the end of the fillet weld joint and at one end of the butt weld joint. A 1/16 in. carbon filler wire was used as needed. After the welds were made utilizing the above gas mixture, samples were obtained from the plate, and subjected to the tests.

A bend test was made on weld samples 1 in. by 6 in. cut from 6 in. by 6 in. plates which had been welded together from one side only. The test samples were polished and bent in the weld 180° over a diameter twice the thickness of the welded plates (.250 in.). The side of the weld on which the metal was deposited was on the outside of the bend on this test. None of the samples of helium-nitrogen butt welds showed fractures, indicating that helium-nitrogen welds have superior ductility.

The presence of heat cracks and gas pockets in the welds was studied by radiograph. The welds made in the helium-nitrogen mixture were free from gas pockets, heat cracks, or other welding defects and were superior to those made with conventional argon-helium mixtures.

The possibility that the new gas mixture might result in the formation of undesirable nitrides, which tend to cause embrittlement of the weld, also was a consideration in these tests. Examination of the microstructure of cross sections from the welds was made using either Nital or Pical etchants. No significant difference between the microstructure of the nitrogen-helium weld and that of welds made with the conventional helium argon mixtures could be found. All were typical of low-carbon steel welds.

The tensile strength of the helium-nitrogen welded samples proved to be at least equally as good as those welded with helium-argon.

In addition to the above properties of the welds made with the helium-nitrogen shielding gas mixture, important cost savings in the process were determined from the tests. The current reduction was as high as 50 percent. For example, in welding .125 in. low-carbon steel with helium-argon, approximately 150 amperes were required for proper penetration but using helium-nitrogen, the same penetration was obtained with 75 amperes. Lowered gas consumption also was a result since a decrease in amperage in inert-gas welding brings a decrease in gas flow. The gas cost of the new mixture was much less than that for the standard helium-argon mixture. A 1/16 in. filler wire was used with the helium-nitrogen gas for single-pass fillet or butt welds. This is a saving in filler material over the 5/64 in. or 3/32 in. filler wire normally used with helium-argon gas.

Greater welding speed and a smaller, cleaner bead were other results obtained. The faster, forehand welding technique was used for fillet welds making possible larger concave beads. Undercutting was eliminated because the helium-nitrogen welds permitted good weld metal wetting action resulting in a minimum restriction in the flow of weld metal up the sides of the fillet legs. The smaller bead which may be obtained means that less grinding is required. This also, of course, reduces production costs.

While the embodiment of the present invention as herein disclosed constitutes a preferred form, it is to be understood that other forms might be adopted, all coming within the scope of the claims which follow.

What we claim as new and desire to obtain by Letters Patent of the United States is:

1. An inert gas mixture for use in gas shielded arc welding operations consisting of a uniform mixture of one part by volume nitrogen and from about twenty to twenty-two parts by volume helium.

2. An inert gas mixture for use in gas shielded arc welding operations consisting of a uniform mixture of one part by volume nitrogen and about twenty-two parts by volume helium.

3. In an arc welding process the step comprising maintaining an arc shielded with a blanket of gas consisting of a uniform mixture of one part by volume nitrogen and from about twenty to twenty-two parts by volume helium.

4. In an arc welding process the step comprising maintaining an arc shielded with a blanket of gas consisting of a uniform mixture of one part by volume nitrogen and twenty-two parts by volume helium.

5. A method for arc welding comprising the step of striking and maintaining an arc between a non-consumable electrode tip and a workpiece while blanketing said electrode tip, said arc and the molten metal portions of said workpiece with a gas consisting of a uniform mixture of one part by volume nitrogen and from twenty to twenty-two parts by volume helium.

6. A method for arc welding comprising the step of striking and maintaining an arc between a non-consumable electrode tip and a workpiece while blanketing said electrode tip, said arc and the molten metal portions of said workpiece with a gas consisting of uniform mixture of one part by volume nitrogen and twenty-two parts by volume helium.

References Cited in the file of this patent

UNITED STATES PATENTS

| 1,746,081 | Hobart | Feb. 4, 1930 |
| 2,053,417 | Brace | Sept. 8, 1936 |

OTHER REFERENCES

Welding Engineer, December 1942, pp. 30–33.